(12) United States Patent
Hirao

(10) Patent No.: US 9,279,490 B2
(45) Date of Patent: Mar. 8, 2016

(54) METHOD OF MAKING A BEVEL GEAR SYSTEM

(71) Applicant: ArvinMeritor Technology, LLC, Troy, MI (US)

(72) Inventor: Wagner Hirao, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 234 days.

(21) Appl. No.: 14/012,477

(22) Filed: Aug. 28, 2013

(65) Prior Publication Data

US 2015/0059180 A1 Mar. 5, 2015

(51) Int. Cl.
| | | |
|---|---|---|
| *F16H 1/20* | (2006.01) | |
| *F16H 48/08* | (2006.01) | |
| *B60K 17/16* | (2006.01) | |
| *F16H 48/38* | (2012.01) | |

(52) U.S. Cl.
CPC .............. *F16H 48/08* (2013.01); *B60K 17/16* (2013.01); *F16H 2048/085* (2013.01); *F16H 2048/087* (2013.01); *F16H 2048/382* (2013.01); *Y10T 29/49464* (2015.01); *Y10T 29/49465* (2015.01)

(58) Field of Classification Search
CPC .............. F16H 48/08; F16H 2048/085; F16H 2048/087; F16H 2048/382; B60K 17/16; Y10T 29/49464; Y10T 29/49465
See application file for complete search history.

(56) References Cited

U.S. PATENT DOCUMENTS

| 4,520,692 | A | * | 6/1985 | Cummins | ..................... 475/245 |
| 4,651,587 | A | * | 3/1987 | Anderson et al. | ............ 74/459.5 |
| 6,517,395 | B1 | | 2/2003 | Higby et al. | |

FOREIGN PATENT DOCUMENTS

| DE | 3311309 A1 | 10/1984 |
| DE | 4115304 A1 | 11/1992 |
| GB | 1360737 | 7/1974 |

OTHER PUBLICATIONS

European Patent Office, Search Report for the corresponding European Patent Application No. EP 14 18 1135 mailed Jan. 28, 2015.

* cited by examiner

*Primary Examiner* — Ryan J Walters
(74) *Attorney, Agent, or Firm* — Brooks Kushman P.C.

(57) ABSTRACT

A method of making a bevel gear system. The method may include selecting a member of the first set of side gears and a member of the second set of side gears corresponding to a desired gear ratio. The selected first side gear may have a different number of teeth than a selected second side gear.

18 Claims, 3 Drawing Sheets

METHOD OF MAKING A BEVEL GEAR SYSTEM

TECHNICAL FIELD

This patent application relates to a method of making a bevel gear system.

BACKGROUND

A propulsion drive train unit including two bevel gears is disclosed in U.S. Pat. No. 6,517,395.

SUMMARY

In at least one embodiment, a method of making a bevel gear system is provided. The method may include providing a pinion gear, a first set of side gears, and a second set of side gears. A desired gear ratio of the bevel gear system may be determined. A member of the first set of side gears and a member of the second set of side gears may be selected corresponding to the desired gear ratio. The selected first side gear may have a different number of teeth than the selected second side gear. The bevel gear system may be assembled such that the selected first and second side gears rotatably engage the pinion gear.

In at least one embodiment, a method of making a bevel gear system is provided. The method may include providing a first set of side gears and a second set of side gears. A desired gear ratio of the bevel gear system may be determined. A member of the first set of side gears and a member of the second set of side gears may be selected corresponding to the desired gear ratio. The selected first side gear may have a different number of teeth than the selected second side gear. The bevel gear system may be assembled such that the selected first and second side gears engage members of a set of pinion gears. Each member of the set of pinion gears is rotatably disposed on a corresponding pin of a spider.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
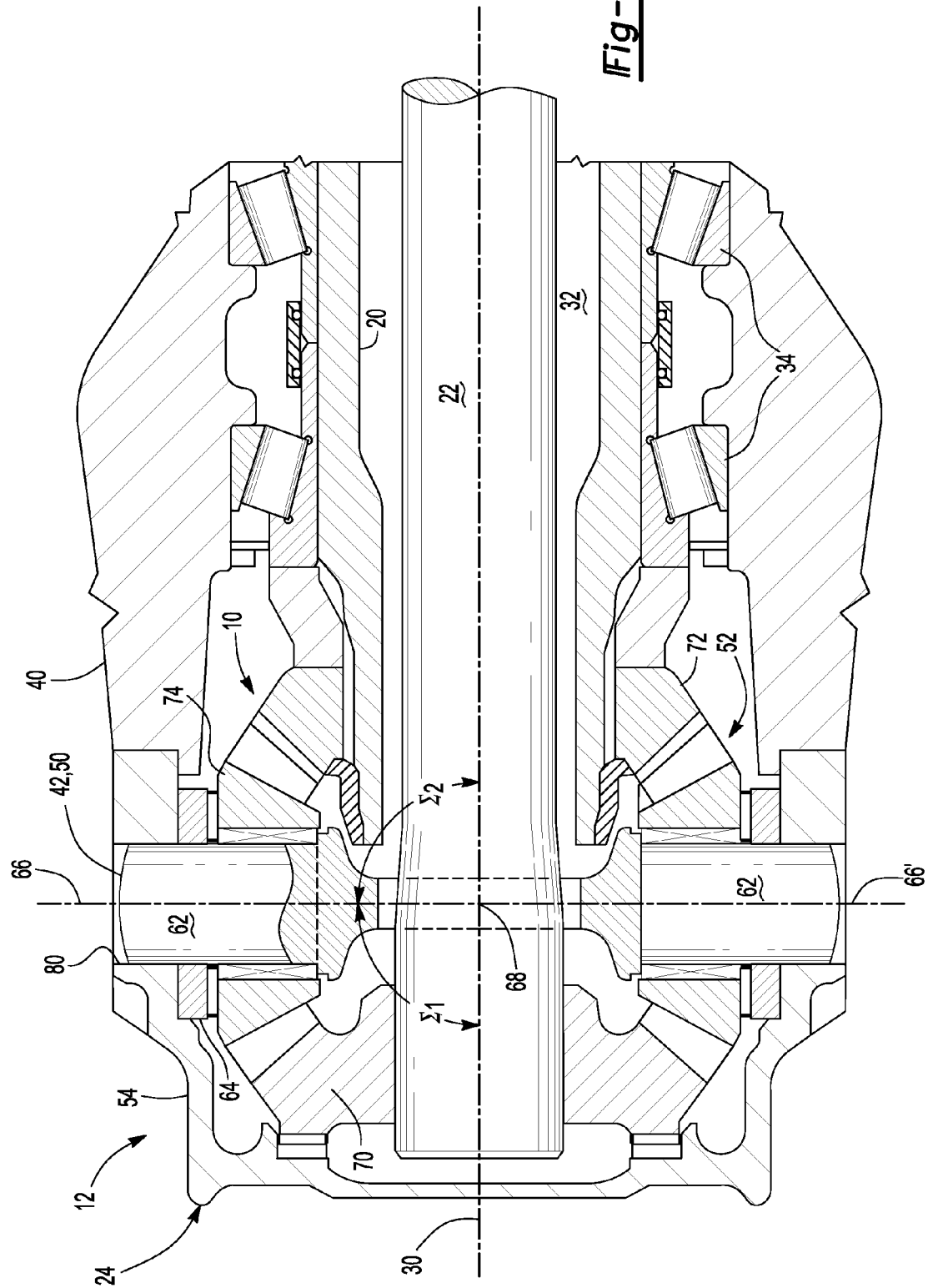
FIG. 1 is a section view of an exemplary bevel gear system.

Referring to FIG. 1, an exemplary bevel gear system 10 is shown. The bevel gear system 10 may be configured for use with a vehicle, such as a motor vehicle like a truck, bus, farm equipment, military transport or weaponry vehicle, or cargo loading equipment for land, air, or marine vessels. More specifically, the bevel gear system 10 may be part of a wheel hub assembly or drivetrain component like a transfer case, differential, or interaxle differential unit that may compensate for speed differences between different axle shafts or axle assemblies. For brevity, the bevel gear system 10 is described below primarily in the context of a wheel hub assembly 12.

A wheel hub assembly 12 may rotatably support a vehicle traction wheel. The wheel hub assembly 12 may include a spindle 20, a shaft 22, and a wheel end assembly 24.

The spindle 20 may be provided with a vehicle component, such as an axle assembly. The spindle 20 may generally extend along but may not rotate about an axis 30. The spindle 20 may define a hole 32 through which the shaft 22 may extend. As such, the spindle 20 may be spaced apart from the shaft 22 to permit the shaft 22 to rotate about the axis 30. The spindle 20 may support one or more wheel bearings 34 that may rotatably support the wheel end assembly 24 as will be discussed in more detail below.

The shaft 22, which may also be called an axle or axle shaft, may provide torque to the wheel end assembly 24. For instance, the shaft 22 may be connected to a vehicle drivetrain component, like a differential or input shaft at a first end and may be coupled to the wheel end assembly 24 at a second end. In at least one embodiment, the shaft 22 may extend along and may rotate about the axis 30. Alternatively, the shaft 22 may be configured for use with an independent suspension system and may have multiple shaft segments and/or joints, such as constant-velocity joints, that facilitate relative movement between the first end and the wheel end assembly 24.

The wheel end assembly 24 may couple the shaft 22 to a traction wheel assembly that may include a tire mounted on a wheel. The wheel end assembly 24 may include a hub 40 and a spider assembly 42.

The hub 40 may be rotatably supported on the spindle 20 by one or more wheel bearings 34. In addition, the hub 40 may be coupled to or fixedly positioned on the spider assembly 42. The wheel may be mounted to the hub 40 and may rotate with the hub 40.

Figure 2:
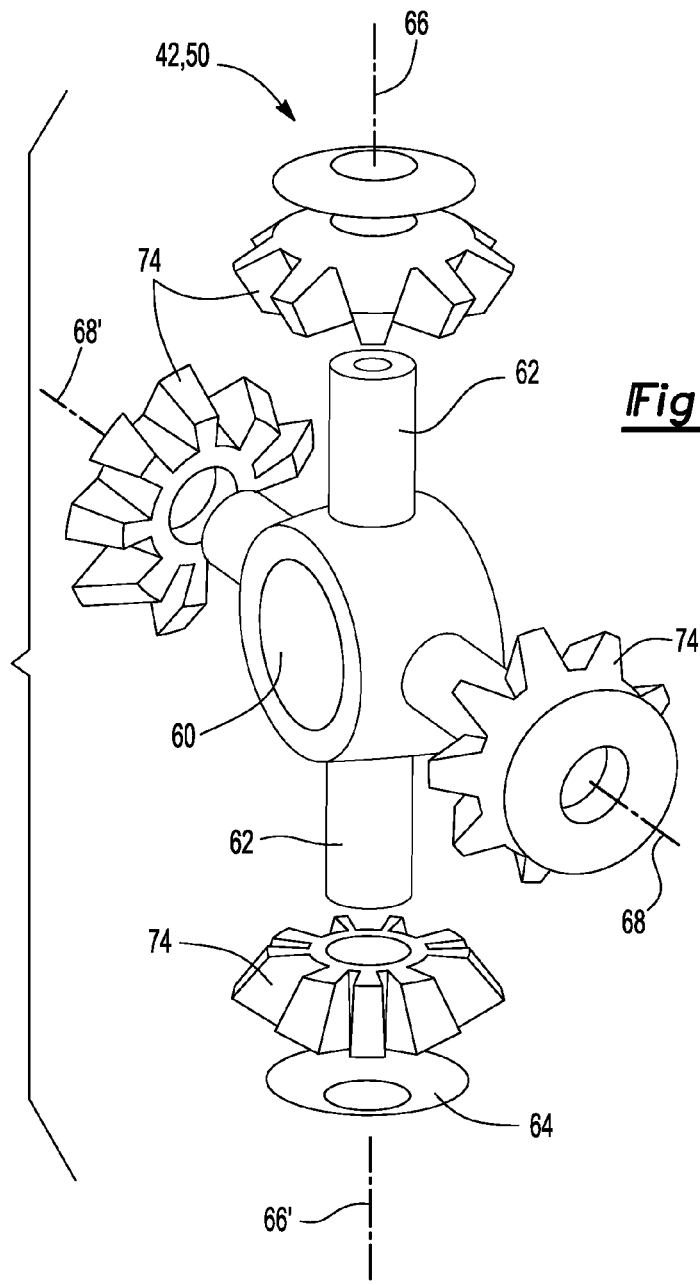
FIG. 2 is a perspective view of an exemplary spider assembly that may be provided with a bevel gear system.

Referring to FIGS. 1 and 2, the spider assembly 42 may transmit torque from the shaft 22 to the hub 40. In addition, the spider assembly 42 may provide gear reduction or gear ratio modification between the shaft 22 and a traction wheel disposed on the hub 40 as will be discussed in more detail below. In at least one embodiment, the spider assembly 42 may include a spider 50, a set of hub gears 52, and a case 54.

The spider 50 may rotate about the axis 30. The spider 50 may have a center bore 60 that may receive the shaft 22. The spider 50 may be spaced apart from the shaft 22 as shown in FIG. 1 or may engage and rotate with the shaft 22 in other contexts, such as in an interaxle differential unit. The spider 50 may include a set of pins 62. The pins 62 may extend away from the center bore 60 and may be arranged one or more axes, such as a first axis 66, a second axis 68, a third axis 66', and a fourth axis 68'. In FIG. 2, the first axis 66 and third axis 66' are coextensive or coaxially disposed and the second axis 68 and fourth axis 68' are coextensive and coaxially disposed. The axes 66, 66', 68, 68' may or may not be coplanar and may intersect each other at the axis 30. In addition, the axes 66, 66', 68, 68' may or may not be disposed substantially perpendicular to each other and/or the axis 30 in one or more embodiments. Ends of the pins 62 may be received in the case 54. Alternatively, a greater or lesser number of pins 62 may be provided in one or more embodiments. For example, at least one pin 62 may be provided that receives a corresponding hub gear 52.

The set of hub gears 52 may include a first side gear 70, a second side gear 72, and a set of pinion gears 74. The first side gear 70, second side gear 72, and a set of pinion gears 74 may be configured as bevel gears.

The first side gear 70 may be fixedly disposed on the shaft 22. For example, the first side gear 70 may include a hole that may include a spline that mates with a corresponding spline on the shaft 22. As such, the first side gear 70 may rotate with the shaft 22.

The second side gear 72 may be fixedly disposed on the spindle 20. For example, the second side gear 72 may include a hole that has a spline that mates with a corresponding spline on the spindle 20. The second side gear 72 may rotate with respect to the first side gear 70.

A pinion gear 74 may be rotatably disposed on each pin 62. Each pinion gear 74 may be generally disposed in the case 54 and may be retained on a corresponding pin 62 with one or more fasteners 64, such as a washer and/or a thrust bearing. In at least one embodiment, a pinion gear 74 may rotate about pins 62 that may extend along one or more axes 66, 66', 68, 68'. Alternatively, fewer pinion gears may be provided or additional pinion gears 74 may be provided along additional pins and/or axes. Each pinion gear 74 may include a set of teeth that mate with the first side gear 70 and second side gear 72. In addition, a set of roller bearings may be disposed between the pinion gear 74 and each pin 62 to facilitate rotation of a pinion gear 74.

The case 54, which may also be called a spider housing, may receive the spider 50 and at least some associated gears. The case 54 may include a plurality of openings 80 that may receive a corresponding pin 62 of the spider 50. As such, the case 54 may rotate about the axis 30 with the spider 50.

Figure 3:
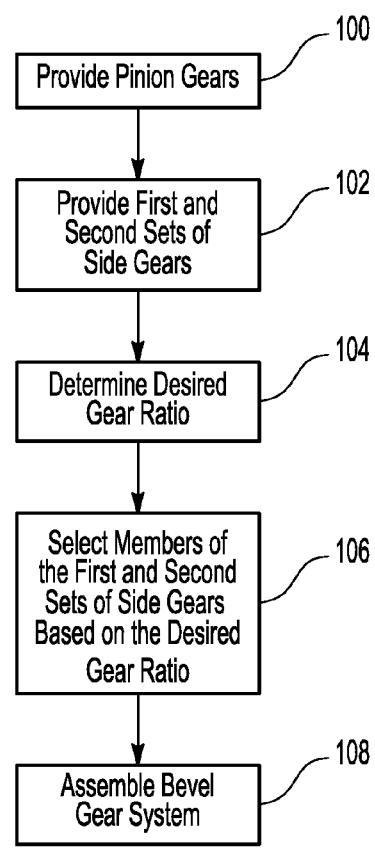
FIG. 3 is a flowchart of a method of making a bevel gear system.
Figure 4:
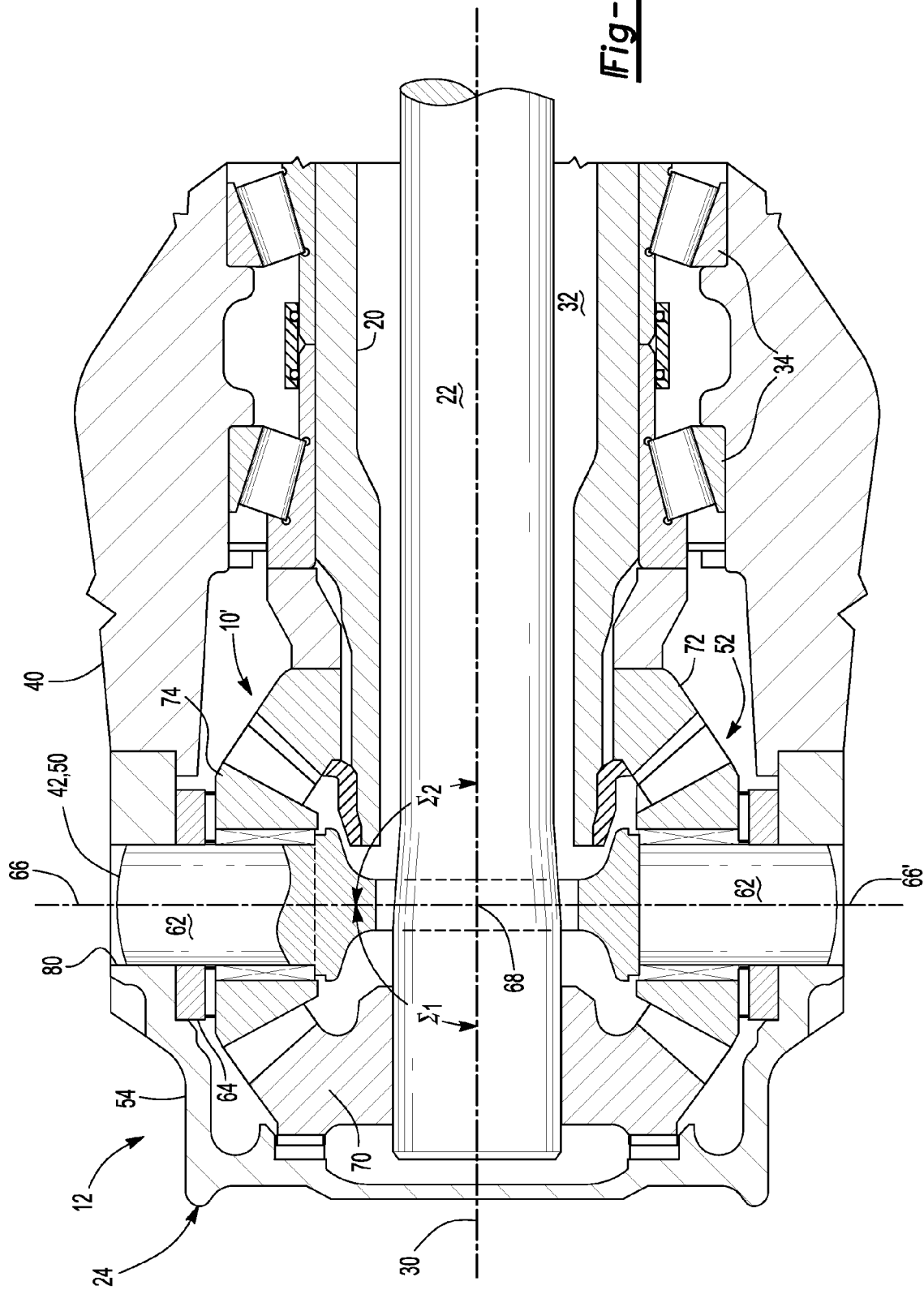
FIG. 4 is a section view of an exemplary second bevel gear system.

Referring to FIG. 3, a method of making a bevel gear system will now be described. The method may allow bevel gear systems having different gear ratios to be made by changing the configuration of the first and second side gears, but not other components, such as the spider, case, pinion gears, and associated fasteners. As such, economies of scale may be realized in that components like the spider, case, and pinion gears may be provided in the same configuration in multiple bevel gear systems that have different gear ratios without being redesigned or retooled, thereby reducing associated costs.

At 100, the method begins by providing a set of pinion gears. The set of pinion gears may have members that have a common design.

At 102, a first set of side gears and a second set of side gears are provided. The first side gear 70 may be a member of the first set of side gears or may be selected from the first set of side gears. Each member of first set of side gears may be configured as a bevel gear and may have a different configuration. More specifically, each member of the first set of side gears may have a different number of teeth than the other members of the set. For instance, one member of the first set of side gears may have 23 teeth, another member may have 24 teeth, etc. As such, the number of teeth may be expressed as a different integer for each member of the set.

The second side gear 72 may be a member of the second set of side gears or may be selected from the second set of side gears. Each member of second set of side gears may be configured as a bevel gear and may have a different configuration. More specifically, each member of the second set of side gears may have a different number of teeth than the other members of the set. For instance, one member of the second set of side gears may have 23 teeth, another member may have 24 teeth, etc.

At 104, a desired gear ratio of the bevel gear system may be determined. The desired gear ratio may be based on design parameters or performance specifications.

At 106, a member of the first set of side gears and a member of the second set of side gears may be selected. The members of the first and second sets of side gears may be selected corresponding to the desired gear ratio. Moreover, the selected first side gear may have a different number of teeth than a selected second side gear.

At 108, the bevel gear system may be assembled. The bevel gear system may be assembled using the selected first side gear and the selected second side gear. The selected first and second side gears may be assembled such that they rotatably engage at least one pinion gear.

The following example is provided to further illustrate the method described above. The gear ratio in a bevel gear system when the first side gear 70 is the driving gear and the second side gear 72 is the output from the case 54 may be expressed by the following formula:

$$q_\tau = Z_3/Z_1 + 1$$

where:

$q_\tau$ is the gear ratio;

$Z_1$ is the number of teeth on the first side gear; and $Z_3$ is the number of teeth on the second side gear.

Thus, when the selected member of the first set of side gears has 23 teeth and the selected member of the set of second side gears has 25 teeth or two more teeth, the gear ratio is 2.09 (i.e., 25/23+1). Similarly, when the selected member of the first set of side gears has 25 teeth and the selected member of the set of second side gears has 23 teeth or two fewer teeth, the gear ratio is 1.92 (i.e., 23/25+1). Also, when the selected member of the first set of side gears has 24 teeth and the selected member of the set of second side gears has 24 teeth, the gear ratio would be 2.00 (i.e., 24/24 +1). In such cases the pinion gear may have a constant number of teeth, such as 16 teeth.

The steps of the method may be repeated to make additional bevel gear systems Having different gear ratio configurations. For example, a second bevel gear system 10' having a different desired gear ratio than the bevel gear system previously assembled may be accomplished by repeating the method steps and selecting a second member of the first set of side gears and another member of the second set of side gears that together correspond to the different desired gear ratio. The selected members of the first and second sets of side gears may again have different numbers of teeth and may be assembled as previously discussed.

In FIG. 1, the shaft angle between the first side gear 70 and the pinion gear 74 (or between the axis 30 and the first axis 66 to the left of the spider 50 from the perspective shown) may be designated $\Sigma_1$. Similarly, the shaft angle between the second side gear 72 and the pinion gear 74 (or between the axis 30 and the first axis 66 to the right of the spider 50 from the perspective shown) may be designated $\Sigma_2$. In FIG. 1, these angles are depicted as being 90°, or perpendicular to the axis 30. Alternatively, these angles may not be the same and may be calculated. $\Sigma_1$ may be determined based on the following formula:

$$\Sigma_1 = \mathrm{acos}((Z_3 - Z_1)/(2 * Z_2))$$

where:

$Z_1$ is the number of teeth on the first side gear;

$Z_2$ is the number of teeth on the pinion gear; and $Z_3$ is the number of teeth on the second side gear.

Similarly, $\Sigma_2$ may be determined based on the following formula:

$\Sigma_2 = a\cos(-(Z_3-Z_1)/(2*Z_2))$ where:

$Z_1$ is the number of teeth on the first side gear;
$Z_2$ is the number of teeth on the pinion gear; and
$Z_3$ is the number of teeth on the second side gear.

As such, the spider orientation with respect to the axis 30 may be non-perpendicular, but may remain constant for different combinations of first side gears and second side gears. As such, wheel hub assemblies, transfer cases, differentials, or interaxle differential units may be provided with generally standardized configurations that may include non-perpendicular or perpendicular spider orientations yet may be configured with different gear ratios by changing the configuration of the first side gear and second side gear.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a bevel gear system comprising:
   providing a pinion gear;
   providing a first set of side gears and a second set of side gears;
   determining a desired gear ratio of the bevel gear system;
   selecting a member of the first set of side gears and a member of the second set of side gears corresponding to the desired gear ratio, wherein a selected first side gear has a different number of teeth than a selected second side gear; and
   assembling the bevel gear system such that the selected first and second side gears rotatably engage the pinion gear, wherein the pinion gear is rotatably disposed on a corresponding pin on a spider and assembling the bevel gear system includes positioning the spider in a case that has a hole that receives the pin, wherein a configuration of the case remains constant regardless of the desired gear ratio and which members of the first and second sets of side gears are selected.

2. The method of claim 1 wherein the selected first side gear has two more teeth than the selected second side gear.

3. The method of claim 2 wherein the selected first side gear is fixedly mounted on a shaft when the bevel gear system is assembled.

4. The method of claim 3 wherein the shaft extends through a spindle and the selected second side gear is fixedly mounted on the spindle when the bevel gear system is assembled.

5. The method of claim 4 wherein the selected second side gear does not rotate about an axis when the bevel gear system is assembled.

6. The method of claim 1 wherein the selected first and second side gears are coaxially disposed.

7. The method of claim 1 wherein the selected second side gear has two more teeth than the selected first side gear.

8. The method of claim 1 wherein the selected first and second side gears have an odd number of teeth.

9. A method of making a bevel gear system comprising:
   providing a first set of side gears and a second set of side gears;
   determining a first desired gear ratio of the bevel gear system;
   selecting a first member of the first set of side gears, designated a first selected first side gear, and a first member of the second set of side gears, designated a first selected second side gear, based on the first desired gear ratio, wherein the first selected first side gear has a different number of teeth than the first selected second side gear; and
   assembling the bevel gear system such that the first selected first side gear and the first selected second side gear engage each member of a set of pinion gears, wherein each member of the set of pinion gears is rotatably disposed on a corresponding pin on a spider and assembling the bevel gear system includes positioning the spider in a case that has a hole that receives at least one pin, wherein a configuration of the spider remains constant regardless of the desired gear ratio and regardless of which members of the first and second sets of side gears are selected.

10. The method of claim 9 wherein each member of the first set of side gears has a different number of teeth and each member of the second set of side gears has a different number of teeth.

11. The method of claim 10 wherein the pinion gear has a constant number of teeth regardless of which members of the first and second sets of side gears are selected.

12. The method of claim 9 wherein the pinion gear has fewer teeth than the first selected first side gear and the first selected second side gear.

13. The method of claim 9 wherein the spider has at least one pin disposed along a first axis and at least one pin disposed along a second axis, wherein a member of the set of pinion gears is rotatably disposed on each pin.

14. The method of claim 13 wherein the configuration of the spider including an angle between the first axis and the second axis remains constant regardless of which member of the first set of side gears is selected.

15. The method of claim 9 wherein the method further comprises:
   determining a second desired gear ratio that differs from the first desired gear ratio;
   selecting a second member of the first set of side gears and a second member of the second set of side gears that together correspond to the second desired gear ratio, wherein the second member of the first set of side gears has a different number of teeth than the first member of the first set of side gears; and
   assembling a second bevel gear system having the second desired gear ratio such that the second member of the first set of side gears and the second member of the second set of side gears both engage a member of a set of pinion gears, wherein the member of the set of pinion gears is rotatably disposed on a corresponding pin on a spider of the second bevel gear system.

16. The method of claim 15 wherein the second member of the first set of side gears has a different number of teeth than the second member of the second set of side gears.

17. The method of claim 16 wherein the first member of the second set of side gears has a different number of teeth than the second member of the second set of side gears.

18. The method of claim 15 wherein the bevel gear system and the second bevel gear system have pinion gears having the same configuration and spiders having the same configuration.

* * * * *